J. B. MILLER AND J. H. BRUNINGA.
TIRE PRESSURE GAGE.
APPLICATION FILED OCT. 23, 1919.
1,334,874.   Patented Mar. 23, 1920.
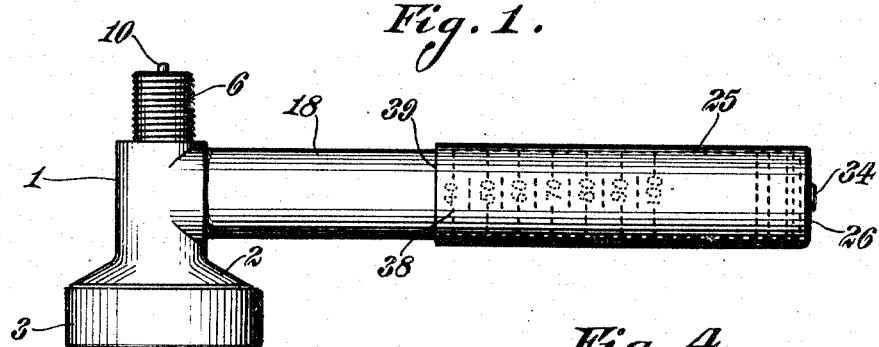
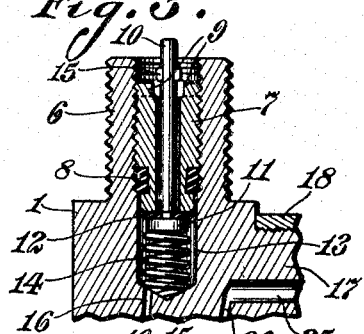
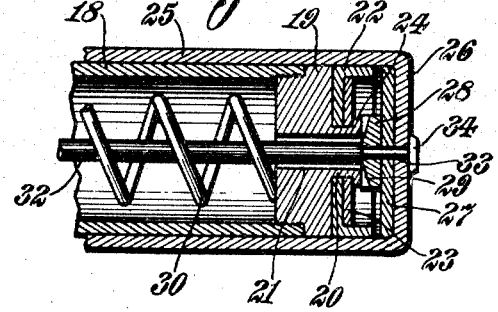
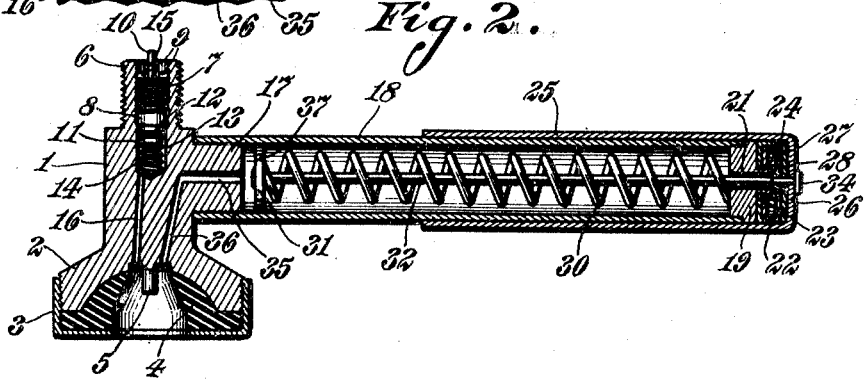
Inventors:
JAMES B. MILLER, & JOHN H. BRUNINGA,
By John H. Bruninga.
Their Attorney.

UNITED STATES PATENT OFFICE.

JAMES B. MILLER AND JOHN H. BRUNINGA, OF ST. LOUIS, MISSOURI, ASSIGNORS TO ISAAC FELDENHEIMER, OF ST. LOUIS, MISSOURI.

TIRE-PRESSURE GAGE.

1,334,874.  Specification of Letters Patent.  Patented Mar. 23, 1920.

Application filed October 23, 1919. Serial No. 332,832.

*To all whom it may concern:*

Be it known that we, JAMES B. MILLER and JOHN H. BRUNINGA, both citizens of the United States, and residing at St. Louis, in the State of Missouri, have invented a certain new and useful Improvement in Tire-Pressure Gages, of which the following is a specification.

This invention relates to tire pressure gages, and more particularly to tire pressure gages of the type whereby the pressure inside of a tire may be measured selectively prior to, during or after inflation.

One of the objects of this invention is to provide a tire gage of the character described, whereby the pressure can be accurately determined and measured.

Another object is to provide a tire pressure gage, which is simple in construction, effective, accurate and permanent in its action, and economical to manufacture.

Further objects will appear from the detail description taken in connection with the accompanying drawing, in which:

Figure 1 is a side elevation of a tire pressure gage embodying this invention;

Fig. 2 is a longitudinal vertical section;

Fig. 3 is an enlarged detail section of Fig. 2, showing the inlet connection and its valve; and Fig. 4 is an enlarged detail of Fig. 2, showing the piston and its connections.

Referring to the accompanying drawing, 1 designates a main head having an enlarged threaded flange 2, which is adapted to receive a threaded cap 3 so as to clamp therebetween a rubber washer 4 in order to form a tire nipple chuck, adapted to be placed upon and make a sealing connection with any standard tire nipple. The chamber of the chuck has positioned therein a lug or kick-off 5, which is formed on the body of the main head 1 and is adapted to coöperate with the valve in a tire nipple to open the same. This chuck and its kick-off are well known in the prior art, and a detail description thereof is, therefore, unnecessary.

An inlet connection 6 is formed on the main head 1 and this may be externally threaded so as to be adapted for coöperation with any form of standard chuck provided on the usual air connections from a source of air supply. The connection 6 is internally threaded to receive a plug 7 which has a washer 8 for forming a sealed joint, and this plug is provided with the usual lugs 9 permitting the same to be screwed in place by the use of any suitable tool, such as the usual tire nipple cap. A stem 10 passes loosely through the plug and this stem is provided with a valve 11 carrying a washer 12 so as to take against the end of the plug 7 as a valve seat. The bore in the connection 6 is continued below the end of the plug 7 so as to form a chamber 13 of the same diameter as the end of the plug, and arranged in this chamber is a spring 14 which bears, at one end, against the valve 11, and at the other end against the bottom of the chamber in order to hold the valve 11 on the bottom of its seat. Wings 15 may be formed on the stem 10 as is usual and it will be noted that this stem extends slightly beyond the connection 6 so as to permit manipulation by hand or by the usual kick-off on the pressure line chuck. A channel 16 leads from the chamber 13 to the chuck chamber and on one side of the lug or kick-off 5.

The main head 1 has formed thereon a threaded gage connection 17 which has mounted thereon, as by threading, a cylindrical casing 18. This casing is internally threaded at its other end and has screwed therein a head or cap 19 which is enlarged so as to form a shoulder taking against the end of the casing in order to form an air tight connection. The end of this head is reduced, as shown at 20, to provide a neck and the head and neck are both bored to provide a channel 21 extending therethrough. A cup piston packing 22 is mounted on the head 19 and around the neck 20, and between the head and a metallic washer 23 so as to form a packing, and when the packing and washer are in place, the end of the neck is peened over as shown at 24 so as to firmly secure the parts together. A cylinder 25 is mounted so as to slide on the casing 18 and the end 26 of this cylinder is closed. The cylinder is, therefore, arranged to work on the casing and relative to the piston formed by the end thereof. The end 26 of the cylinder is perforated and receives a perforated washer 27 of substantially the diameter of the cylinder and also a smaller washer 28 provided with radial grooves or recesses 29. A spring 30 is mounted in the casing and bears at one end against the head 19, while the other end bears against a perforated disk 31 mounted on and fixed to a bar 32 passing loosely through the channel 21 and reduced at its end as shown at 33, the reduced end passing through the washers 28 and 27 and through the end 26 of the cylinder and being riveted over as shown at 34. In order to make the connection an air tight one, solder may be applied to the head 26.

Channels 35 and 36 connect the casing with the chuck chamber, the channel 36 being located on the opposite side of the lug or kick-off 5 from the channel 16. The disk 31 may be further perforated at one or more points 37 so as to allow free communication to the casing and the cylinder. The casing is graduated, as shown at 38, in pounds per square inch or in suitable units of pressure, while the end 39 of the cylinder acts as a pointer to indicate, by its coöperation with the pressure graduations, the pressure of the fluid to be measured.

In order to measure the pressure in a tire, the chuck is placed on the tire nipple thereby causing the lug or kick-off 5 to open the tire valve and connect the chuck chamber with the interior of the tire. Escape of air through the connection 6 is prevented by the valve 11; however, the air can pass through the channels 36—35 into the casing 18 and hence through the channel 21 into the cylinder. This will cause the cylinder to move outwardly on the casing compressing the spring 30 and indicating by its extension and the coöperation of the end 39 of the cylinder with the proper graduations 38 on the casing, the proper pressure inside of the tire. When it is desired to relieve the pressure, the valve 11 is manipulated by pressure on the extended stem 10, thereby permitting relief of pressure until the proper pressure has been established.

In order to utilize this pressure gage for the purpose of measuring the pressure during inflation, the chuck is placed on the tire, the nipple and the pressure line chuck is now placed on the connection 6, thereby causing the kick-off on this chuck to open the valve 11 and permit the air of line pressure to flow through the channel 16 into the chuck chamber and hence into the tire. The channel 16, as well as the valve 11, act as a reducing valve to reduce the line pressure somewhat and cause it to build up in the tire as the pressure builds up in the chuck chamber. Accordingly, as the pressure in the chuck chamber builds up, it will build up in unison in the casing and cylinder of the gage so that the position of the cylinder on the casing will always indicate accurately the pressure in the tire as it is being built up. When the proper pressure has been established, the line chuck is removed from the inlet connection 6.

It will be noted that in this device the spring employed is a compression spring which is desirable for greatest accuracy and that the neck 20 forms a stop engaged by the washer 28 so as to initially tension the spring and initially locate the cylinder. Moreover, the provision of the washer 27 permits ready assembling, since the washers can be placed on the reduced portion 33 of the stem or bar 32 and the whole can then be inserted into the cylinder, thereby permitting accurate positioning with the perforation in the end of the cylinder. The provision of the head 19 with its reduced portion not only provides for a cheap tubular structure of the casing, but also provides for an extended bearing of the cup packing.

It is obvious that various changes may be made in the details of construction without departing from the spirit of this invention; it is, therefore, to be understood that this invention is not to be limited to the specific details shown and described.

Having thus described the invention, what is claimed is:

1. A tire pressure gage, comprising a casing, a tire nipple chuck on one end of said casing, a piston on the other end of said casing, a cylinder mounted for movement on said piston and casing and communicating with said casing through said piston, a spring in said casing and bearing at one end against the piston end thereof, and a connection between the other end of said spring and said cylinder.

2. A tire pressure gage, comprising a casing, a tire nipple chuck on one end of said casing, a piston on the other end of said casing, a cylinder mounted for movement on said piston and casing and communicating with said casing through said piston, a spring in said casing and bearing at one end against the piston end thereof, and a bar connecting the other end of said spring with the end of said cylinder and passing through said piston.

3. A tire pressure gage, comprising, a casing, having a chuck adapted for connection with a tire nipple, a cylinder mounted for movement on and communicating with said casing, a piston on said casing and working in said cylinder, a spring in said casing, and a compressing connection between said spring and said cylinder.

4. A tire pressure gage, comprising, a casing, having a chuck adapted for connection with a tire nipple, a cylinder mounted for movement on and communicating with said casing, a piston on said casing and working in said cylinder, a spring in said casing, a compressing connection between said spring and said cylinder, and a stop for said cylinder between said cylinder and said casing.

5. A tire pressure gage, comprising, a casing, a tire nipple chuck on one end of said casing, a head mounted on the other end of said casing and having a reduced neck, a piston packing on said head and retained by said neck, a cylinder mounted for movement on said casing and said packing and communicating with said casing through said head, and a spring mounted in said casing and operatively connected with said cylinder.

6. A tire pressure gage, comprising, a tire nipple chuck having an inlet connection and having a gage connection, a casing communicating with said gage connection, a piston on said casing, a cylinder mounted for movement on said casing and said piston and communicating with said casing, and a spring mounted in said casing and operatively connected with said cylinder.

In testimony whereof we affix our signatures this 23rd day of September, 1919.

JAMES B. MILLER.
JOHN H. BRUNINGA.